United States Patent
Ballestero Méndez et al.

(10) Patent No.: US 12,415,613 B2
(45) Date of Patent: Sep. 16, 2025

(54) AIRCRAFT FUSELAGE SECTION

(71) Applicant: Airbus Operations S.L., Getafe (ES)

(72) Inventors: Jorge Ballestero Méndez, Getafe (ES);
Nuria Colmenarejo Matellano, Getafe (ES); Raúl José Gómez Vizcaíno, Getafe (ES); Ana Fernández Ramírez, Getafe (ES); Daniel Cernada Morales, Getafe (ES); César Julián Jiménez Rodríguez, Getafe (ES)

(73) Assignee: Airbus Operations S.L., Getafe (ES)

( * ) Notice: Subject to any disclaimer, the term of this patent is extended or adjusted under 35 U.S.C. 154(b) by 0 days.

(21) Appl. No.: 18/742,345

(22) Filed: Jun. 13, 2024

(65) Prior Publication Data
US 2024/0417096 A1     Dec. 19, 2024

(30) Foreign Application Priority Data
Jun. 15, 2023 (EP) ...................... 23382596

(51) Int. Cl.
*B64D 37/04* (2006.01)
*B64C 1/06* (2006.01)

(52) U.S. Cl.
CPC ............ *B64D 37/04* (2013.01); *B64C 1/0685* (2020.01)

(58) Field of Classification Search
CPC ...... B64D 37/04; B64D 37/005; B64D 37/34; B64C 1/0685; F17C 2205/0323; F17C 2205/0382; F17C 2205/0388; F17C 2205/0394; F17C 2205/0385
See application file for complete search history.

(56) References Cited

U.S. PATENT DOCUMENTS

| | | | | |
|---|---|---|---|---|
| 3,502,106 A | * | 3/1970 | Blanchard ............ | B64D 37/005 137/881 |
| 3,948,411 A | * | 4/1976 | Conte .................. | F17C 13/005 220/560.13 |
| 3,967,465 A | * | 7/1976 | Asselman ............ | C01B 3/0063 62/46.3 |
| 5,833,172 A | * | 11/1998 | Grafwallner .......... | B64D 37/26 244/135 R |
| 6,123,295 A | * | 9/2000 | Wexler ................ | B64D 37/04 244/119 |
| 7,234,667 B1 | * | 6/2007 | Talmage, Jr. ........ | B64D 25/12 244/120 |

(Continued)

FOREIGN PATENT DOCUMENTS

EP    4124568 A1    2/2023
WO    2023074870 A1    5/2023

OTHER PUBLICATIONS

Brewer, G.D., et al. "Volume II Final Report: Study of the Application of Hydrogen Fuel to Long-Range Subsonic Transport Aircraft." NASA-CR-132559. Jan. 1975. (Year: 1975).*

(Continued)

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

An aircraft section comprising a first fuel storage tank and a second fuel storage tank arranged in a caudal tandem configuration. The corresponding casings, housing conduits configured for distribution of fuel to and from inside the tanks, are arranged in a common section of the fuselage and spaced between them. Also an aircraft with such a section.

17 Claims, 3 Drawing Sheets

(56) References Cited

U.S. PATENT DOCUMENTS

| | | | | |
|---|---|---|---|---|
| 7,775,391 B2* | 8/2010 | Harper | ............... | F17C 1/00 |
| | | | | 220/560.04 |
| 9,938,025 B2* | 4/2018 | Faure | ............... | B64D 37/30 |
| 10,520,116 B2* | 12/2019 | Rappitsch | ............. | F16L 39/005 |
| 10,583,934 B2* | 3/2020 | Hara | ............... | B64D 37/005 |
| 10,773,822 B2* | 9/2020 | Haberbusch | ........... | B64U 80/25 |
| 10,800,525 B2* | 10/2020 | Sankrithi | ............... | B64C 30/00 |
| 10,844,971 B2* | 11/2020 | Haug | ............... | B64D 37/005 |
| 10,969,028 B2* | 4/2021 | Haug | ............... | F16K 1/22 |
| 11,052,995 B2* | 7/2021 | Farouz-Fouquet | ....... | B64C 5/10 |
| 11,940,097 B2* | 3/2024 | Clarke | ............... | F17C 13/002 |
| 12,017,789 B2* | 6/2024 | Minas | ............... | B64D 37/20 |
| 12,065,260 B2* | 8/2024 | Pissavin | ............... | B64D 37/32 |
| 12,078,108 B2* | 9/2024 | Minas | ............... | F02C 3/22 |
| 12,084,194 B2* | 9/2024 | Emerson | ............... | B64D 37/30 |
| 12,208,913 B2* | 1/2025 | Linde | ............... | B64D 37/04 |
| 12,208,914 B2* | 1/2025 | Andrieu | ............... | B64D 37/22 |
| 2002/0179610 A1* | 12/2002 | Fraklin, III | ............... | F17C 1/04 |
| | | | | 220/560.1 |
| 2005/0089661 A1* | 4/2005 | Hogenson | ............... | B64G 1/14 |
| | | | | 428/36.5 |
| 2014/0339367 A1 | 11/2014 | Sankrithi et al. | | |
| 2015/0040986 A1 | 2/2015 | Tichborne et al. | | |
| 2023/0348081 A1* | 11/2023 | Riediger | ............... | B64D 27/24 |
| 2024/0359809 A1* | 10/2024 | Linde | ............... | B64C 1/068 |
| 2024/0359811 A1* | 10/2024 | Milliere | ............... | B64D 37/005 |
| 2024/0400198 A1* | 12/2024 | Tomažic | ............... | B64D 37/04 |
| 2025/0035268 A1* | 1/2025 | Mazzer | ............... | B01F 35/51 |

OTHER PUBLICATIONS

Brewer, G.D., et al. "Study of LH2 Fueled Subsonic Passenger Transport Aircraft." NASA-CR-144935. Jan. 1976. (Year: 1976).*

Flynn, Thomas. "Cryogenic Engineering." 2nd ed. CRC Press. 2004. (Year: 2004).*

European Search Report for corresponding European Patent Application No. 23382596 dated Nov. 10, 2023.

* cited by examiner

AIRCRAFT FUSELAGE SECTION

CROSS-REFERENCES TO RELATED APPLICATIONS

This application claims the benefit of European Patent Application Number 23382596.7 filed on Jun. 15, 2023, the entire disclosure of which is incorporated herein by way of reference.

FIELD OF THE INVENTION

The present invention belongs to the technical field of fuel storage systems in aircraft. Particularly, the invention provides an aircraft section comprising a first fuel storage tank and a second fuel storage tank arranged in a caudal tandem configuration.

BACKGROUND OF THE INVENTION

Due to environmental reasons, challenges to reduce the use of fossil fuels must be increasingly faced. In this scenario, hydrogen produced on the basis of renewable energy is a reasonable candidate for efficient energy supply. Its high energy density makes it an emerging alternative fuel for aircraft applications.

In particular, hydrogen is an attractive fuel for high-altitude short-medium range aircraft because it contains about 3 times the energy per kilogram as compared with traditional hydrocarbon fuels. Therefore, in aircraft applications, said high specific energy of hydrogen may be a key enabler. However, practical considerations have largely prevented its use. While the specific energy of hydrogen is very high, the energy per volume unit is comparatively low. Liquid hydrogen (LH2) enhances its energy density relative to gaseous form while allowing to reduce the mass of the tank required to confine the hydrogen within as a result of the lower pressure in liquid state. Liquid hydrogen at 20 K and 1 bar pressure has a density of 70 g/l compared to the 40 g/l of gaseous hydrogen at 88 K and 700 bar. Only cryo-compressed hydrogen has a higher density, with a value of 80 g/l at 38 K and 300 bar. According to these parameters, liquefied cryogenic form allows efficient storage at low pressure.

In this regard, LH2 cryotanks (i.e., tanks configured for housing liquid hydrogen and for maintaining the necessary conditions for maintaining hydrogen in the liquid state) are one of the key components of the structure of future generations of heavy lift launch vehicles, space exploration structures and new green aircraft. It is in aircraft where the greatest challenges lie in developing hydrogen storage systems as a result of the need for reduced weight in combination with good insulating and permeation properties.

An additional challenge in aircraft industry is to make optimal use of the volume available inside an aircraft to accommodate fuel storage elements, as well as additional elements and equipment for fuel conditioning, maintenance of optimal operating conditions and fuel distribution.

SUMMARY OF THE INVENTION

The present invention provides an aircraft fuselage section according to one or more embodiments and an aircraft according to one or more embodiments.

In a first inventive aspect, the invention provides an aircraft fuselage section extending along a longitudinal direction, wherein the fuselage section comprises a first fuel storage tank and a second fuel storage tank arranged in a caudal tandem configuration, such that the second tank is arranged consecutively with respect to the first tank according to the longitudinal direction, wherein the first tank comprises a first end portion oriented towards the second tank, and the second tank comprises a second end portion oriented towards the first tank, such that a fuselage subsection is defined between the first end portion of the first tank and the second end portion of the second tank, wherein the aircraft fuselage section further comprises: a first casing arranged at the first end portion of the first tank, the first casing being configured to house conduits in fluid communication with the interior of the first tank, and a second casing arranged at the second end portion of the second tank, the second casing being configured to house conduits in fluid communication with the interior of the second tank, and wherein: the first casing extends from the first end portion of the first tank into the fuselage subsection, the second casing extends from the second end portion of the second tank into the fuselage subsection, and the first casing is spaced apart from the second casing according to a separation direction contained in a plane perpendicular to the longitudinal direction.

Throughout the document, in relation to the term "first fuel storage tank", the term "first tank" will also be used to refer to such "first fuel storage tank". Similarly, in relation to the term "second fuel storage tank", the term "second tank" will also be used to refer to such "second fuel storage tank".

Regarding the first tank and the second tank, having more than a single tank in the same aircraft section provides various benefits, such as increased safety due to redundancy. In this sense, the presence of two tanks serves as an operational backup which increases the reliability of the fuel storage capacities of the aircraft section in the event one of the functions or components of one of the first or second tank fails.

It shall be understood that both tanks are configured for housing a fuel within. Preferably, both tanks are cryotanks and are configured for housing liquid hydrogen (LH2) or any other suitable fuel used in the aircraft industry.

In relation with the first and second end portions of the corresponding first and second tank, they shall be understood as the portions of each tank located in the rearmost and forwardmost position, respectively, according to the longitudinal direction of the fuselage section.

More in particular, once the aircraft fuselage section is implemented as part of an aircraft, the longitudinal direction of the aircraft fuselage section corresponds to the longitudinal axis of said aircraft, and the perpendicular plane is a plane defined by the pitch axis and the yaw axis of the aircraft (i.e., the horizontal and vertical axes when considering a straight cruise flight). In this regard, it shall be understood that the forwardmost part of the aircraft corresponds to the cockpit and the rearmost part of the aircraft corresponds to the tail cone. In this sense, it shall be understood that the first end portion of the first tank is oriented rearward and that the second end portion of the second tank is oriented forward.

With regard to the tandem configuration, the arrangement of the first and second tanks one after the other, according to the longitudinal direction of the fuselage section, makes it possible to optimize the cross-section of the fuselage section intended to accommodate each of the first and second tanks. The total volume of fuel in the fuselage section of the aircraft is therefore also optimized.

According to the invention, there is a separation between the first tank and the second tank along the longitudinal direction. In this regard, the first end portion of the first tank and the second end portion of the second tank are arranged oriented in opposite directions, and both tanks are arranged such that a predetermined distance is established between the first end portion of the first tank and the second end portion of the second tank. That is, the first end portion of the first tank is oriented toward the location of the second tank, and the second end portion of the second tank is oriented toward the location of the first tank, and a certain volume of the aircraft fuselage section is defined between them.

In this regard, said volume extends longitudinally along the distance defined between both tanks and shall be regarded as a subsection of the aircraft fuselage section.

Regarding the first casing and the second casing arranged respectively at the first end portion of the first tank and the second end portion of the second tank, these casings are configured to house conduits in fluid communication with the interior of the corresponding first or second tank. More in particular, inside these casings there can be a set of different pipe and/or valve systems for carrying out tasks such as refueling, feeding of main engines, distribution between different tanks or ventilation of the tanks. It shall be understood that such casings shall be provided with the necessary means of passage (i.e., openings), such as slots or holes, for the pipes routing the fuel from and into the tank.

Advantageously, the casings provide an enclosure extending from each respective tank, acting as a layer of safety to prevent any failure in case of fuel leaks and minimize the thermal gradient effects between the tank and its outside environment.

Regarding the arrangement of the first casing and the second casing relative to each other, the first casing extends from the first end portion of the first tank into the fuselage subsection, and the second casing extends from the second end portion of the second tank into the fuselage subsection, the first casing and the second casing being spaced apart from each other according to any direction defined in a plane perpendicular to the longitudinal direction. Said direction is referred to herein as "separation direction".

The separation established between the first casing and the second casing improves operational safety of an aircraft comprising the aircraft fuselage section of the invention by preventing direct contact between both casings.

Additionally, the arrangement of both casings in a common volume of the aircraft fuselage section (i.e., the fuselage subsection defined between the first end portion of the first tank and the second end portion of the second tank), provides a compact constructive layout that allows optimizing the volume of the aircraft fuselage section dedicated to the housing of the elements responsible for the routing and channeling of fuel into and from the tanks, as well as the first and second casing configured to cover and protect them.

Advantageously, the length of the aircraft fuselage section required to hold the tanks and the casings, as well as the total fuselage length of an aircraft comprising said aircraft fuselage section is reduced.

Regarding the materials used to manufacture the tanks, in an embodiment, at least one of the first tank or the second tank is made of Fiber Reinforced Polymer ('FRP') material (also referred to as 'composite materials').

Advantageously, the use of composite materials for the manufacturing of the tanks provides the benefits of composite material in terms of material performance, weight saving, material cost, production and industrialization features.

In an embodiment, at least one of the first tank or the second tank is metallic.

According to the invention, the casings are offset at least according to any direction defined in a plane perpendicular to the longitudinal direction.

In an embodiment, the first casing is spaced apart from the second casing also according to the longitudinal direction.

In this embodiment, the forwardmost portion of the second casing is set back with respect to the rearmost portion of the first casing.

In another embodiment, the first casing and the second casing are arranged such that at least one plane perpendicular to the longitudinal direction intersects both casings.

In this embodiment, the first and second casing overlap (i.e., occupy the same position) along at least a portion of the longitudinal direction. However, since the first and second casings are separated along a direction perpendicular to the longitudinal direction, there is no direct contact between both casings.

Once the aircraft fuselage section is implemented as part of an aircraft, the longitudinal direction of the aircraft fuselage section corresponds to the longitudinal axis of said aircraft, and the perpendicular plane is a plane defined by the pitch axis and the yaw axis of the aircraft (i.e., the horizontal and vertical axes when considering a straight cruise flight).

In a particular embodiment where the aircraft fuselage section is implemented as part of an aircraft, the first casing is spaced apart from the second casing according to the yaw axis of the aircraft.

In a particular embodiment where the aircraft fuselage section is implemented as part of an aircraft, the first casing is spaced apart from the second casing according to the pitch axis of the aircraft.

In a particular embodiment where the aircraft fuselage section is implemented as part of an aircraft, the first casing is spaced apart from the second casing according to the yaw and pitch axes of the aircraft.

In a particular embodiment, the ratio between the separation distance between the first casing and the second casing in the separation direction and the size of the first and second casing dimension in the separation direction is comprised in the range from 8% to 10%.

As previously defined, according to the invention, the casings are offset according to any direction contained in a plane perpendicular to the longitudinal direction. In this sense, once the aircraft fuselage section is implemented as part of an aircraft, the longitudinal direction of the aircraft fuselage section corresponds to the longitudinal axis of said aircraft and the perpendicular plane is a plane defined by the pitch axis and the yaw axis of the aircraft (i.e., the horizontal and vertical axes when considering a straight cruise flight).

Accordingly, the defined ratio refers to the distance of separation between the first casing and the second casing along the separation direction versus the size or dimension of said casings along said separation direction.

In a particular embodiment, the size of each of the first casing and second casing in the separation direction is comprised in the range from 40-45% of the size of the aircraft fuselage section in the separation direction.

In a particular embodiment, the separation distance between the first casing and the second casing in the separation direction is comprised in the range from 2-10% of the size of the aircraft fuselage section in the separation direction.

In an embodiment, the first casing is separated from the second tank a distance according to the longitudinal direction.

In an embodiment, the second casing is separated from the first tank a distance according to the longitudinal direction.

In an embodiment, the coupling between the first casing and the first end portion of the first tank defines a closed volume between an inner surface of the first casing and the first end portion.

In an embodiment, the coupling between the second casing and the second end portion of the second tank define a closed volume between an inner surface of the second casing and the second end portion.

In an embodiment, the coupling between the first casing and the first end portion of the first tank is configured to assure the tightness of the closed volume confined within.

In an embodiment, the coupling between the second casing and the second end portion of the second tank is configured to assure the tightness of the closed volume confined within.

In an embodiment, the volume defined between the first and/or second casing and the corresponding first and/or second end portion houses a portion of the pipes routing the fuel from and into the tanks. In this regard, it shall be understood that any connecting interface between a casing and the corresponding end portion, as well as between a casing and any pipe passing through said casing is provided with a fluid-tight fit.

In an embodiment, the first casing and/or the second casing is configured to keep the closed volume confined within under vacuum conditions.

Advantageously, a vacuum provided within the corresponding casing provides optimum insulation properties for the pipes and/or valve systems housed within the first and/or second casing, and provides enhanced performance regarding prevention of any failure in case of fuel leaks and reduction of the thermal gradient effects between the tank and its outside environment.

In a particular embodiment, the aircraft fuselage section comprises an airframe and the first casing and/or the second casing is spaced apart from the airframe.

According to this embodiment, the first casing and/or second casing is sized not to occupy transversely (i.e., in cross-section) the total volume of the fuselage section in which they are located. In this sense, there shall be a clearance at all points of the corresponding casing from the airframe of the aircraft fuselage.

In embodiments where a casing is not aligned with the longitudinal direction of the fuselage section of the aircraft, i.e. the casing is offset and closer to a particular area of the airframe, the volume dedicated to accommodate the tanks and their respective casings may be optimized by a side-by-side or an up-down configuration, but maintaining a clearance of the corresponding casing with respect to the closest area of the airframe. This clearance with respect to the closest area of the airframe allows for enhanced operational safety conditions by preventing direct contact between the corresponding casing and the airframe.

In an embodiment, the tank has a revolution geometry.

In an embodiment, the first casing and/or the second casing is spaced apart from the closest part of the airframe a distance greater than or equal to about 4% of the size of the aircraft fuselage section in the separation direction.

In a particular embodiment, the first tank comprises a central portion with a substantially cylindrical geometry.

In a particular embodiment, the second tank comprises a central portion with a substantially cylindrical geometry.

In a particular embodiment, the first tank comprises a central portion with a substantially elliptical geometry.

In a particular embodiment, the second tank comprises a central portion with a substantially elliptical geometry.

In a particular embodiment, the first tank comprises a central portion with a substantially frustoconical geometry.

In a particular embodiment, the second tank comprises a central portion with a substantially frustoconical geometry.

In a particular embodiment, the aircraft fuselage section comprises a tail cone and the second tank comprises a central portion with a substantially frustoconical geometry and is arranged at a tapering section of the tail cone, such that the transverse areas of both the second tank and the tapering section of the tail cone decrease along the longitudinal direction.

The fuselage of an aircraft is normally divided into three main components: a tapered nose section which houses at least a portion of the cockpit from where the crew controls the operation of the aircraft, a substantially tubular section housing the passenger cabin, and a tapered tail cone. The tail cone of an aircraft plays a critical role in the structure and function of the aircraft due to its location.

The tail cone is defined between the end of the tubular section of the fuselage destined to the housing of the payload and the aft end of the fuselage, and thus represents a smooth transition from a section with substantially constant diameter to a tapered section, that is, with at least one sloped surface.

Taking into account the above, according to this embodiment, the second tank is housed in the tail cone of the aircraft fuselage section and has a central portion with a substantially frustoconical geometry that allows it to fit the progressively narrower geometry in the longitudinal direction to the rearmost part of the aircraft, thus optimizing the volume available for storing fuel, and allowing it to maintain a clearance with respect to the tail cone tapering airframe.

In an embodiment, the first tank and the second tank are arranged with the longitudinal axes of their corresponding substantially cylindrical and/or substantially frustoconical central portions aligned and parallel to the longitudinal direction of the aircraft fuselage section.

In an embodiment, the first end portion of the first tank is provided with a dome-shaped geometry.

In an embodiment, the second end portion of the second tank is provided with a dome-shaped geometry.

Domes are structural elements shaped as rounded vaults and which normally have a circular base. Circular domes are surfaces of revolution. These surfaces are generated by rotating a meridian curve about an axis. The meridian curve is regarded as one half of the curve resulting from a cross-section through the center of the dome.

In an embodiment, the dome-shaped geometry of the first end portion and/or the second end portion is a spherical cap geometry.

In an embodiment, the first end portion and/or the second end portion is provided with a toroidal geometry.

In a particular embodiment, the first casing is arranged at the apex of the dome-shaped first end portion of the first tank.

In a particular embodiment, the second casing is arranged at the apex of the dome-shaped second end portion of the second tank.

It shall be understood that the apex (also known as the 'pole') of a dome-shaped end portion, shall correspond to the furthest point of the dome-shaped from the circular base of the dome-shaped end portion. In particular, the apex generally corresponds to the crossing of the dome-shaped structure with the axis about which the meridian curve is rotated in order to generate the dome geometry.

The apex of a dome-shaped structure is a point of high stiffness with respect to the other structural points of said dome-shaped structure. In this sense, the apex of a dome-shaped end portion represents an optimal location for the arrangement of pipe and valve systems routing fuel into and from the tank.

In this regard, according to embodiments where the first tank and/or the second tank comprise pipe or valve system arranged at the apex of the dome-shaped end portions the corresponding first casing and/or second casing is preferably arranged also at the corresponding apex.

In a second inventive aspect, the invention provides an aircraft comprising an aircraft fuselage section according to any embodiment of the first inventive aspect.

In a particular embodiment, the aircraft fuselage section is an unpressurized rear section of the aircraft.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from preferred embodiments of the invention, given just as examples and not being limited thereto, with reference to the drawings.

DETAILED DESCRIPTION OF THE PREFERRED EMBODIMENTS

Once the object of the invention has been outlined, specific non-limitative embodiments are described hereinafter.

Figure 1:
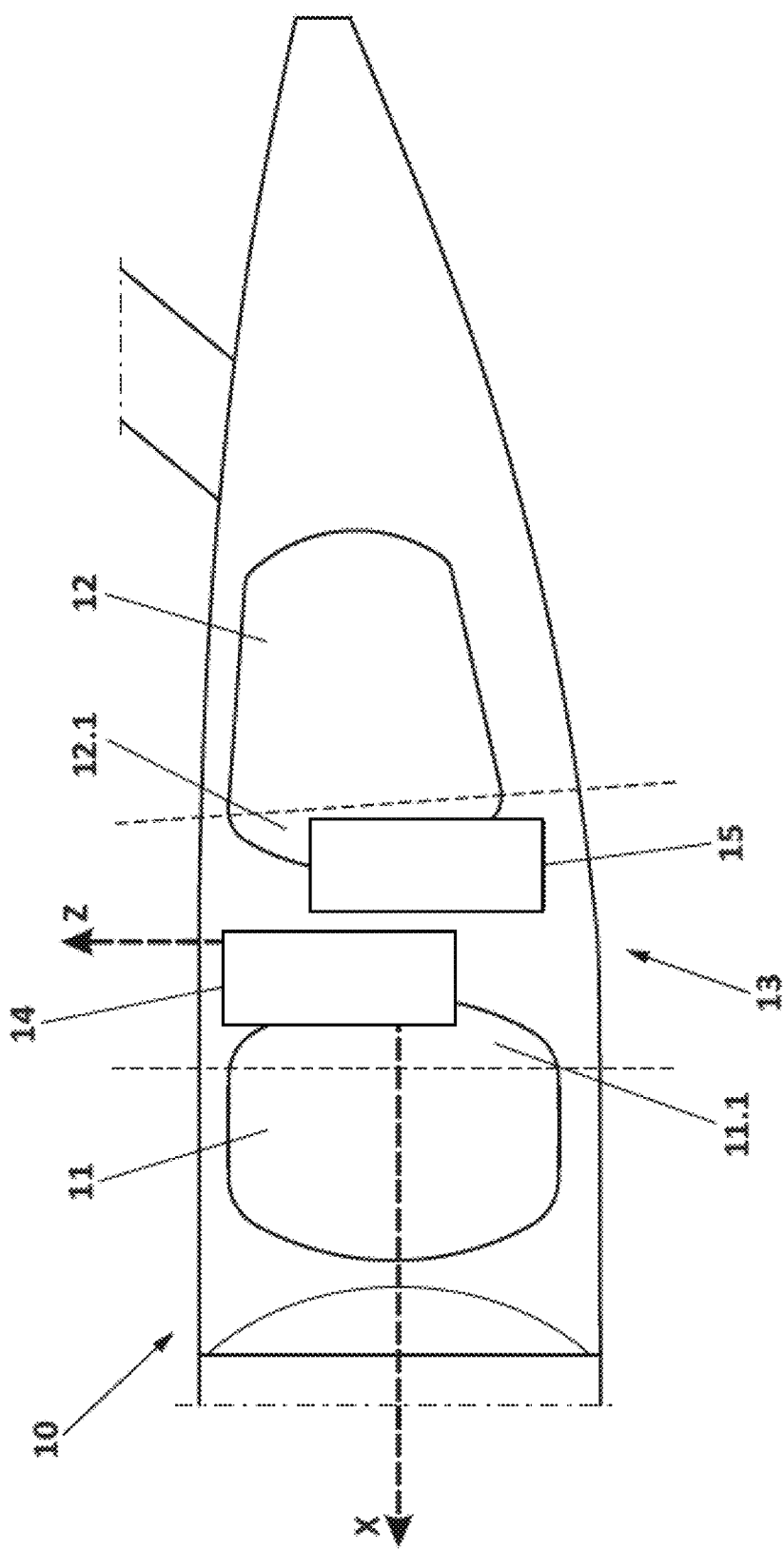
FIG. 1 shows a schematic representation of a lateral cross-sectional view of an aircraft fuselage section according to an embodiment of the invention.

FIG. 1 shows a schematic representation of a lateral cross-sectional view of an aircraft fuselage section (10) according to an embodiment of the invention.

More particularly, the aircraft fuselage section (10) shown is an unpressurized fuselage section of an aircraft (20) which also comprises the tail cone of the aircraft (20), the aircraft fuselage section (10) extending along a longitudinal direction (X) (represented as the dashed line X). Regarding said longitudinal direction, although only a portion of the aircraft (20) is shown, it is understood that the positive direction of the longitudinal axis (X) is considered from the tail cone towards cockpit of the aircraft (20). In this sense, the tail cone is regarded as the rearmost part of the aircraft fuselage section (10). On the other hand, the cross sections (i.e., perpendicular to the longitudinal axis (X)) of the aircraft fuselage section (10) define planes defined by the Y and Z axes shown with corresponding dashed lines. As shown in FIG. 1, the Z-axis (i.e., the vertical direction of the aircraft, perpendicular to the longitudinal axis (X)) corresponds to the yaw axis. The Y-axis (i.e., the horizontal direction of the aircraft, perpendicular to the longitudinal axis (X)), is shown in relation to FIG. 2, as it is described hereinafter, and corresponds to the pitch axis.

As can be seen in FIG. 1, the aircraft fuselage section (10) comprises a first fuel storage tank (11) and a second fuel storage tank (12) arranged in a caudal tandem configuration, such that the second tank (11) is arranged consecutively with respect to the first tank (11) according to the longitudinal direction (X).

Both the first tank (11) and the second tank (12) are configured for housing a fuel within. In an embodiment, both tanks (11, 12) are cryotanks and are configured for housing liquid hydrogen.

As can be seen, the first tank (11) comprises a central portion with a substantially (i.e., +/−10%) cylindrical geometry. At both sides of said central portion according to the longitudinal axis (X), two corresponding end portions are arranged, said end portions being provided with a dome-shaped geometry. More in particular, reference is made to the rearmost end portion of the first tank (11), which is referred to as the first end portion (11.1) of the first tank (11). As can be seen, said first end portion (11.1) is oriented rearward, that is, toward the location of the second tank (12).

The second tank (12) comprises a central portion with a substantially frustoconical geometry. At both sides of said central portion according to the longitudinal axis (X), two corresponding end portions are arranged, said end portions being provided with a dome-shaped geometry. More in particular, reference is made to the forwardmost end portion of the second tank (12), which is referred to as the second end portion (12.1) of the second tank (12). As can be seen, said second end portion (12.1) is oriented forward, that is, toward the location of the first tank (11).

Additionally, as can be seen, in this embodiment the tail cone of the aircraft (20) of the aircraft fuselage section (10) shown, has a tapering geometry, with the bottom surface, as shown in FIG. 1, sloping upwards, which results in a reduction of the fuselage cross-section in the longitudinal direction to the rearmost part of the aircraft (20).

In this sense, in the embodiment shown in FIG. 1, the central portion of the second tank (12) is also provided with its lowermost surface (according to the lateral view provided in FIG. 1) sloping upwards in order to fit the progressively narrower volume of the tail cone, thus optimizing the volume available for storing fuel.

The end portion (11.1) of the first tank (11) and the second end portion (12.1) of the second tank (12) are arranged oriented in opposite directions. In this sense, as can be seen, a separation is provided between the first tank (11) and the second tank (12) along the longitudinal axis (X). More in particular, a certain volume of the aircraft fuselage section (10) is defined as a fuselage subsection (13) of the aircraft fuselage section (10), said subsection (13) of the aircraft fuselage section (10) being defined between the first end portion (11.1) of the first tank (11) and the second end portion (12.1) of the second tank (12). For illustrative purposes, said subsection (13) is shown in both FIGS. 1 and 2 constrained by two limits represented by dashed lines provided, in the first (11) and second (12) tanks, at the boundaries between the central portions and the corresponding end portions (11.1, 12.1).

Additionally, a first casing (14) and a second casing (15) are arranged, respectively, at the first end portion (11.1) of the first tank (11) and the second end portion (12.1) of the second tank (12). Each casing (14, 15) is configured for housing conduits (not-shown), such as pipe and/or valve systems in fluid communication with the interior of the corresponding first (11) or second tank (12), serving as an enclosure acting as a layer of safety to prevent any failure in case of fuel leaks and minimize the thermal gradient effects between the corresponding tank (11, 12) and its outside environment.

In the embodiment shown in FIG. 1, the first casing (14) and the second casing (15) are configured to keep the conduits housed within under vacuum conditions. More in particular, the coupling between the first casing (14) and the first end portion (11.1) of the first tank (11) define a closed volume between an inner surface of the first casing (14) and the first end portion (11.1). In turn, the coupling between the second casing (15) and the second end portion (12.1) of the second tank (12) define a closed volume between an inner surface of the second casing (15) and the second end portion (12.1).

In an embodiment, the coupling between the first casing (14) and the first end portion (11.1) of the first tank (11) assures the tightness of the closed volume confined within. In turn, the coupling between the second casing (15) and the second end portion (12.1) of the second tank (12) assures the tightness of the closed volume confined within.

In this regard, in order to keep a closed volume housed within under vacuum conditions, it shall be understood that any connecting interface between a casing (14, 15) and the corresponding end portion (11.1, 12.1) of the tank (11, 12), as well as between a casing (14, 15) and any pipe passing through said casing (14, 15) is provided with a fluid-tight fit.

Regarding the arrangement of the first casing (14) and the second casing (15) relative to each other, it can be seen that the first casing (14) extends from the first end portion (11.1) of the first tank (11) into the fuselage subsection (13), and the second casing (15) extends from the second end portion (12.1) of the second tank (12) into the fuselage subsection (13). In this sense, FIG. 1 shows both casings (14, 15) schematically depicted as respective squares. As can be seen, the first casing (14) and the second casing (15) are spaced apart from each other according to a direction perpendicular to the longitudinal direction (X) and, more in particular, according to the Z-axis. In this embodiment, as can be seen, the casings (14, 15) are arranged according to an up-down layout. More in particular, the first casing (14) is located in an upper position with respect to the second casing (15). As shown, the first casing (14) is separated from the second tank (12) and, more in particular, from the second end portion (12.1) a distance according to the longitudinal direction (X). In turn, the second casing (15) is separated from the first end portion (11.1) of the first tank (11) a distance according to the longitudinal direction (X). Additionally, in this embodiment there is also a separation distance between the first casing (14) and the second casing (15) according to the longitudinal direction (X). This is, the forwardmost portion of the second casing (15) is set back, according to the longitudinal direction (X), with respect to the rearmost portion of the first casing (14).

Figure 2:
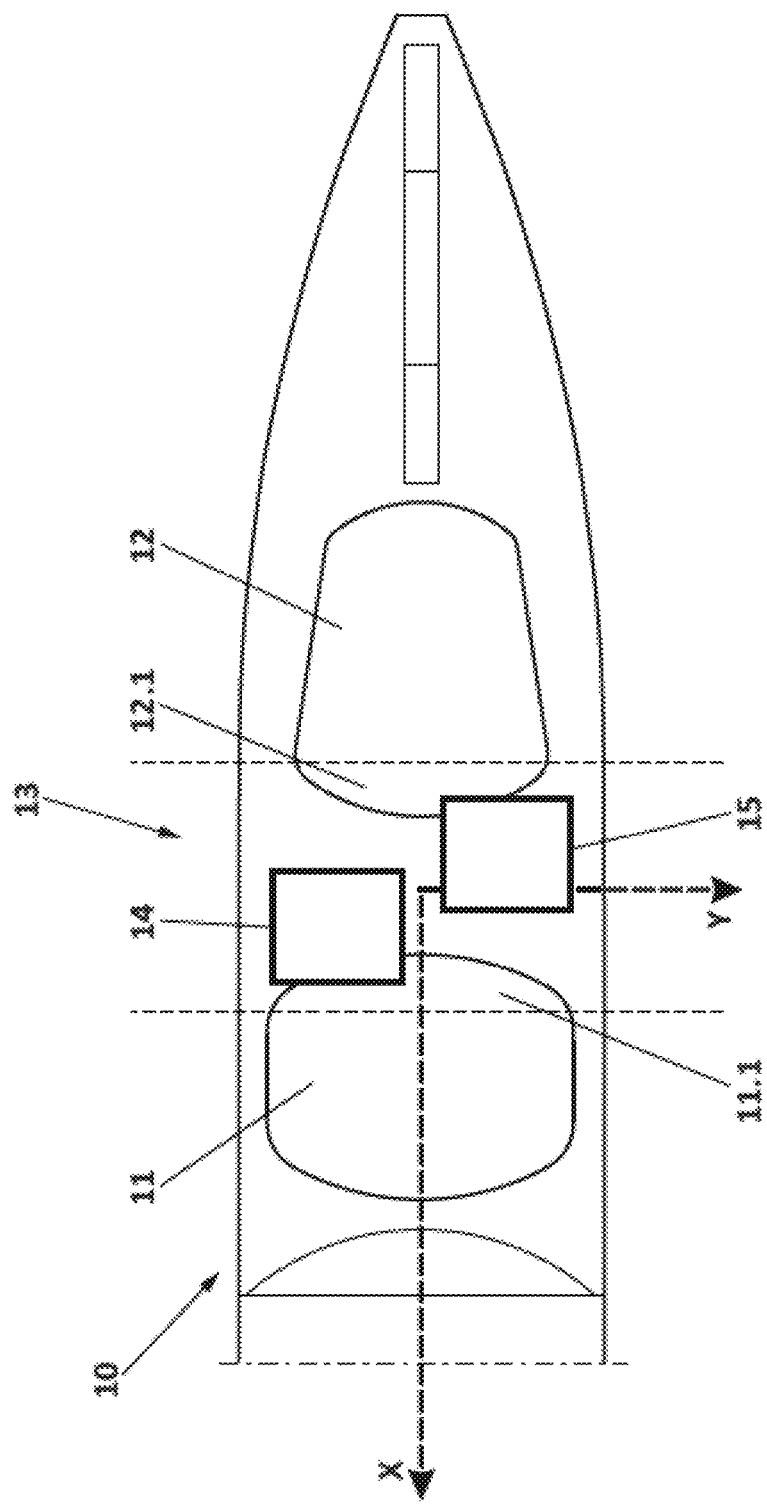
FIG. 2 shows a schematic representation of a cross-sectional top view of an aircraft fuselage section according to an embodiment of the invention.

FIG. 2 shows a schematic representation of a cross-sectional top plan view of an aircraft fuselage section (10) according to an embodiment of the invention.

The aircraft fuselage section (10) shown in FIG. 2 is similar to that shown in FIG. 1. In particular, the aircraft fuselage section (10) shown is an unpressurized fuselage section of an aircraft (20) which also comprises the tail cone of the aircraft (20).

A first fuel storage tank (11) and a second fuel storage tank (12) can be seen arranged in a caudal tandem configuration, such that the second tank (12) is arranged consecutively with respect to the first tank (11) according to the longitudinal direction (X).

As for the geometric references for describing the relative location of the elements of the fuselage section (10), as in FIG. 1, it is understood that the positive direction of the longitudinal axis (X) is considered from the tail cone towards the aircraft cockpit (20). The Y-axis (i.e., the horizontal direction of the aircraft, perpendicular to the longitudinal axis (X)), corresponds to the pitch axis.

The second tank (12) comprises a central portion with a substantially frustoconical geometry, and the tail cone of the aircraft (20) comprises a tapering geometry, resulting in a reduction of the fuselage cross-section in the longitudinal direction to the rearmost part of the aircraft (20). Alike the layout shown in FIG. 1, the second tank (12), with the frustoconical shape of its central portion, fits the progressively narrower volume of the tail cone, thus optimizing the volume available for storing fuel.

Regarding the arrangement of the first casing (14) and the second casing (15), the first casing (14) is spaced apart from the second casing (15) according to a direction perpendicular to the longitudinal direction (X) and, more in particular, according to the Y-axis shown. In this sense, FIG. 2 shows both casings (14, 15) schematically depicted as respective squares. Finally, alike the layout shown in FIG. 1, it can be seen that the first casing (14) extends from the first end portion (11.1) of the first tank (11) into the fuselage subsection (13) defined between the first end portion (11.1) of the first tank (11) and the second end portion (12.1) of the second tank (12), and the second casing (15) extends from the second end portion (12.1) of the second tank (12) into said fuselage subsection (13). Also, the first casing (14) is separated from the second tank (12) and, more in particular, from the second end portion (12.1) a distance according to the longitudinal direction (X). In turn, the second casing (15) is separated from the first end portion (11.1) of the first tank (11) a distance according to the longitudinal direction (X).

Finally, as it can be seen, there is also a clearance between each of the casings (14, 15) and the part of the fuselage airframe closest to each casing (14, 15).

While FIG. 1 shows a schematic view of a layout of the casings (14, 15) where both casings (14, 15) are offset according to:
- a direction contained in a plane perpendicular to the longitudinal direction and, more in particular, according to the yaw axis (Z), and
- the longitudinal direction (X), this is, where the forwardmost portion of the second casing is set back with respect to the rearmost portion of the first casing, in FIG. 2, the first casing (14) and the second casing (15) are arranged such that at least one plane perpendicular to the longitudinal direction (X) intersects both casings, This is, in FIG. 2, the first (14) and second (15) casing overlap (i.e., occupy the same position) along at least a portion of the longitudinal direction (X).

Additionally, while FIG. 1 shows a schematic view of an up-down layout of the casings (14, 15) according to the main directions of the aircraft (20), i.e., with a separation distance between the casings (14, 15) along the yaw axis (Z), FIG. 2 shows an alternative layout for spacing the casings (14, 15) in a side-by-side configuration, i.e., with no separation between casings with respect to the yaw axis (Z), but with a separation component according to the pitch axis (Y).

Both the up-down layout and the side-by-side layout provide the advantage of allowing to reduce the aircraft fuselage section (10) length intended for storing fuel when compared to an aircraft where the elements responsible for the routing of fuel into and from the tanks are not arranged in the same subsection of the aircraft fuselage section.

Finally, a configuration for the relative arrangement between casings (14, 15) with a combination of offsets in both the yaw axis (Z) and pitch axis (Y) is also possible, with the same advantages.

Figure 3:
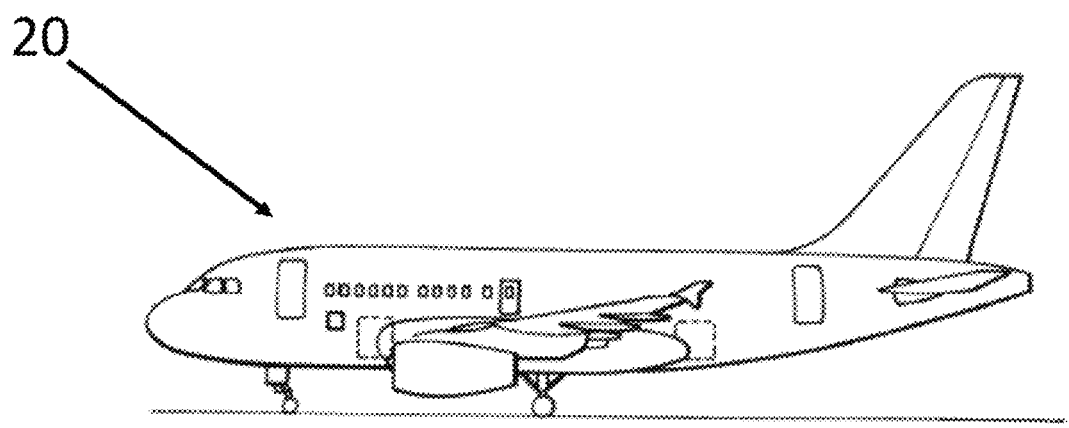
FIG. 3 shows a schematic representation of an aircraft comprising an aircraft fuselage section according to an embodiment of the invention.

FIG. 3 shows an embodiment of an aircraft (20) comprising an aircraft fuselage section (10) according to an embodiment of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. An aircraft fuselage section of an aircraft extending along a longitudinal direction, wherein the aircraft fuselage section comprises:
    a first fuel storage tank and a second fuel storage tank arranged in a caudal tandem configuration, such that the second fuel storage tank is arranged consecutively with respect to the first fuel storage tank according to the longitudinal direction;
    wherein the first fuel storage tank comprises a first end portion oriented towards the second fuel storage tank, and the second fuel storage tank comprises a second end portion oriented towards the first fuel storage tank, such that a fuselage subsection is defined between the first end portion of the first fuel storage tank and the second end portion of the second fuel storage tank;
    wherein the aircraft fuselage section further comprises:
    a first casing arranged at the first end portion of the first fuel storage tank, the first casing being configured to house at least two conduits in fluid communication with an interior of the first fuel storage tank, such that the at least two conduits pass through the first casing, and
    a second casing arranged at the second end portion of the second fuel storage tank, the second casing being configured to house at least two conduits in fluid communication with an interior of the second fuel storage tank, such that the at least two conduits pass through the second casing;
    and wherein:
    the first casing extends from the first end portion of the first fuel storage tank into the fuselage subsection,
    the second casing extends from the second end portion of the second fuel storage tank into the fuselage subsection,
    the first casing and the second casing are configured to keep a closed volume confined within the first casing and the second casing under vacuum conditions, and
    the first casing spaced apart from the second casing according to a separation direction contained in a plane perpendicular to the longitudinal direction.

2. The aircraft fuselage section according to claim 1, wherein the first casing and the second casing are arranged such that at least one plane perpendicular to the longitudinal direction intersects both casings.

3. The aircraft fuselage section according to claim 1, wherein a ratio between a separation distance between the first casing and the second casing in the separation direction and a size of a first and second casing dimension in the separation direction is in a range from 8% to 10%.

4. The aircraft fuselage section according to claim 1, wherein:
    a size of each of the first casing and second casing in the separation direction is a range of 40-45% of a size of the aircraft fuselage section the separation direction; or
    a separation distance between the first casing and the second casing in the separation direction is in a range of 2-10% of a size of the aircraft fuselage section in the separation direction of the aircraft fuselage section; or
    both.

5. The aircraft fuselage section according to claim 1, wherein the first casing, the second casing, or both are configured to keep a corresponding closed volume confined within under vacuum conditions.

6. The aircraft fuselage section according to claim 1, further comprising:
    an airframe, and
    wherein the first casing, the second casing, or both are spaced apart from the airframe.

7. The aircraft fuselage section according to claim 6, wherein the first casing, the second casing, or both are spaced apart from a closest part of the airframe a distance greater than or equal to about 4% of a size of the aircraft fuselage section in the separation direction.

8. The aircraft fuselage section according to claim 1, wherein the first fuel storage tank, the second fuel storage tank, or both comprise a central portion with a substantially cylindrical geometry.

9. The aircraft fuselage section according to claim 1, wherein the first fuel storage tank, the second fuel storage tank, or both comprise a central portion with a substantially frustoconical geometry.

10. The aircraft fuselage section according to claim 9, further comprising:
    a tail cone,
    wherein the second fuel storage tank comprises a central portion with a substantially frustoconical geometry and is arranged at a tapering section of the tail cone, such that a transverse area of both the second fuel storage tank and the tapering section of the tail cone decrease along the longitudinal direction.

11. The aircraft fuselage section according to claim 9, wherein the first fuel storage tank and the second fuel storage tank are arranged with longitudinal axes, respectively, of a corresponding substantially cylindrical, a substantially frustoconical central portions, or both aligned and parallel to the longitudinal direction of the aircraft fuselage section.

12. The aircraft fuselage section according to claim 1, wherein the first end portion of the first fuel storage tank, the second end portion of the second fuel storage tank, or both are provided with a dome-shaped geometry.

13. The aircraft fuselage section according to claim 12, wherein the first casing, the second casing, or both are arranged, respectively, at an apex of a corresponding dome-shaped end portion of the first fuel storage tank or the second fuel storage tank.

14. An aircraft comprising
an aircraft fuselage section according to claim 1.

15. The aircraft fuselage section according to claim 1, wherein:
- connecting interfaces between the first casing and the at least two conduits which pass through the first casing are provided with a fluid-tight fit;
- connecting interfaces between the second casing and the at least conduits which pass through the second casing are provided with a fluid-tight fit;
- a connecting interface between the first casing and the first end portion of the first fuel storage tank is provided with a fluid-tight fit; and
- a connecting interface between the first casing and the first end portion of the first fuel storage tank is provided with a fluid-tight fit.

16. The aircraft fuselage section according to claim 1, wherein the first casing and the second casing overlap along at least a portion of the longitudinal direction.

17. The aircraft fuselage section according to claim 1, wherein the first casing is spaced apart from the second casing along a pitch axis of the aircraft and a yaw axis of the aircraft.

* * * * *